United States Patent
Landry

(10) Patent No.: US 12,391,211 B2
(45) Date of Patent: Aug. 19, 2025

(54) REMOTE VEHICLE THEFT-PREVENTION AND RECOVERY DEVICE

(71) Applicant: Jerome Landry, Yorkville, IL (US)

(72) Inventor: Jerome Landry, Yorkville, IL (US)

( * ) Notice: Subject to any disclaimer, the term of this patent is extended or adjusted under 35 U.S.C. 154(b) by 225 days.

(21) Appl. No.: 18/331,229

(22) Filed: Jun. 8, 2023

(65) Prior Publication Data
US 2024/0367609 A1 Nov. 7, 2024

Related U.S. Application Data

(60) Provisional application No. 63/463,957, filed on May 4, 2023.

(51) Int. Cl.
| | | |
|---|---|---|
| *B60R 25/04* | (2013.01) | |
| *B60R 25/01* | (2013.01) | |
| *B60R 25/20* | (2013.01) | |
| *B60R 25/30* | (2013.01) | |
| *B60R 25/40* | (2013.01) | |

(52) U.S. Cl.
CPC .............. *B60R 25/04* (2013.01); *B60R 25/01* (2013.01); *B60R 25/20* (2013.01); *B60R 25/305* (2013.01); *B60R 25/403* (2013.01); *B60R 2325/101* (2013.01); *B60R 2325/205* (2013.01); *B60R 2325/207* (2013.01)

(58) Field of Classification Search
CPC ......... B60R 25/04; B60R 25/01; B60R 25/20; B60R 25/305; B60R 25/403
See application file for complete search history.

(56) References Cited

U.S. PATENT DOCUMENTS

| | | | | |
|---|---|---|---|---|
| 5,926,086 | A * | 7/1999 | Escareno | B60R 25/33 340/426.21 |
| 6,480,103 | B1* | 11/2002 | McCarthy | B60Q 3/30 73/23.3 |
| 11,572,036 | B1* | 2/2023 | Gilbert | B60R 25/21 |
| 2005/0197744 | A1* | 9/2005 | Kalau | B60R 25/2009 701/1 |
| 2006/0232131 | A1* | 10/2006 | Endo | B60R 25/043 307/10.2 |
| 2018/0072263 | A1* | 3/2018 | Green | B60R 21/0136 |
| 2022/0169206 | A1* | 6/2022 | Moeller | G06F 8/65 |
| 2023/0093918 | A1* | 3/2023 | Romero | B60R 25/104 340/426.18 |
| 2024/0203223 | A1* | 6/2024 | Jang | B60R 25/24 |

\* cited by examiner

*Primary Examiner* — Tan Q Nguyen
(74) *Attorney, Agent, or Firm* — Brennan, Manna & Diamond, LLC

(57) ABSTRACT

A remote vehicle theft-prevention and recovery device is provided. The device is comprised of a module with a plurality of structures and features to prevent successful vehicle theft. Said features include an audible alarm, a camera, the ability to activate the hazard lights of the vehicle, the ability to lock the doors and windows of the vehicle, limiting the acceleration of the vehicle, and viewing the real-time GPS location of the vehicle. Said features can be controlled by a user via a remote fob or a mobile application.

18 Claims, 4 Drawing Sheets

REMOTE VEHICLE THEFT-PREVENTION AND RECOVERY DEVICE

CROSS-REFERENCE TO RELATED APPLICATION

The present application claims priority to, and the benefit of, U.S. Provisional Application No. 63/463,957, which was filed on May 4, 2023, and is incorporated herein by reference in its entirety.

FIELD OF THE INVENTION

The present invention relates generally to the field of vehicle anti-theft devices. More specifically, the present invention relates to a remote vehicle theft-prevention and recovery device that prevents successful vehicle theft by allowing a user to remotely activate an audible alarm, activate a camera, activate the hazard lights of the vehicle, lock the doors and windows of the vehicle, limit the acceleration of the vehicle, and view the real-time GPS location of the vehicle. Accordingly, the present disclosure makes specific reference thereto. Nonetheless, it is to be appreciated that aspects of the present invention are also equally applicable to other like applications, devices, and methods of manufacture.

BACKGROUND

Vehicle theft is an unfortunate occurrence in many areas. However, there is little a vehicle owner can do to prevent vehicle theft after a vehicle has been stolen. This is especially true if the owner did not witness the theft occur and cannot physically intervene to stop the theft.

Therefore, there exists a long-felt need in the art for a device that prevents vehicle theft attempts from being successful. There also exists a long-felt need in the art for a remote vehicle theft prevention device that can be activated to prevent successful vehicle theft while the theft is occurring. More specifically, there exists a long-felt need in the art for a remote vehicle theft prevention device that can be activated remotely to prevent successful vehicle theft.

The subject matter disclosed and claimed herein, in one embodiment thereof, comprises a remote vehicle theft-prevention and recovery device. The device is comprised of a module with a plurality of structures and features to prevent successful vehicle theft. Said features include, an audible alarm, a camera, the ability to activate the hazard lights of the vehicle, the ability to lock the doors and windows of the vehicle, limiting the acceleration of the vehicle, and viewing the real-time GPS location of the vehicle. Said features can be controlled by a user via a remote fob or a mobile application.

In this manner, the remote vehicle theft-prevention and recovery device of the present invention accomplishes all the foregoing objectives and provides a device that prevents vehicle theft. More specifically, the device can be activated to prevent successful vehicle theft while the theft is occurring. In addition, the device can be advantageously activated remotely to prevent successful vehicle theft.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a remote vehicle theft-prevention and recovery device. The device is comprised of a module that can be installed within or on a vehicle. The module has a plurality of features that can be controlled via a remote fob and/or a mobile application to allow a user to prevent the stealing of the vehicle the module is installed within.

The module is comprised of at least one lead wire that places at least one processor of the module in wired electrical communication with the electronic computer system of the vehicle the module is installed on/in. The module is also comprised of a plurality of transmitters, such as a GPS transmitter, which transmits the real-time GPS location of the module (and thus the vehicle) using satellite or other wireless GPS signals known in the art. The module is also comprised of at least one wireless transmitter that places the module in wireless electrical communication with at least one wireless receiver of the fob and/or the smart device the mobile application is installed on. The module receives wireless communication from at least one wireless transmitter of the fob and/or smart device that the mobile application is installed on.

The module is further comprised of at least one speaker that produces a loud audible alarm, tone, sound, etc., to deter a thief from continuing to steal the vehicle. The module may also be comprised of at least one camera connected to the module such that the camera can record photo and video of the thief stealing the vehicle, wherein photos/videos from the camera can then be uploaded to the mobile application via the transmitter and stored.

The module is also comprised of a plurality of other features. Said features may be accessed/controlled via at least one button on the fob or via the mobile application/software once installed on a smart device such as, but not limited to, a cell phone, a tablet, a computer, etc. A first feature allows a user to remotely activate the hazard lights of the vehicle to alert other drivers around the vehicle. Another feature includes allowing a user to remotely lock the doors and windows of the vehicle, such that said lock cannot be overridden by the thief manually attempting to unlock the door/window using the manual buttons inside the vehicle. A user can also activate the speaker to produce an audible alarm. Furthermore, the camera can be remotely activated to take photos/video of the location of the vehicle and/or the thieves who have stolen the vehicle. In addition, the acceleration of the vehicle can be limited via electrical communication from the lead wire to the accelerator position sensor of the vehicle which configures the sensor to not allow the vehicle to accelerate above idle speed. A user can also view the real-time GPS location of the module on a map interface.

The present invention is also comprised of a first method of using the device. First, a device is provided comprised of a module comprised of a GPS transmitter, a wireless transmitter, a receiver, a lead wire, a battery, a speaker, and a camera; and a fob comprised of at least one button, a transmitter, and a receiver. Once a vehicle the module is attached to has been stolen, a user can press the button on the fob to control a function of the module such as, but not limited to, activating the camera, activating the speaker to produce an audible alarm, activating the hazard lights of the vehicle, locking the doors/windows of the vehicle, limiting the acceleration of the vehicle, viewing the GPS location of the vehicle, etc.

The present invention is also comprised of a second method of using the device. First, a device is provided comprised of a module comprised of a GPS transmitter, a wireless transmitter, a receiver, a lead wire, a battery, a speaker, a camera, and a mobile application. Once a vehicle the module is attached to has been stolen, a user can use the mobile application to a control a function of the module such as, but not limited to, activating the camera, activating the speaker to produce an audible alarm, activating the hazard lights of the vehicle, locking the doors/windows of the vehicle, limiting the acceleration of the vehicle, viewing the GPS location of the vehicle, etc.

Accordingly, the remote vehicle theft-prevention and recovery device of the present invention is particularly advantageous as it is a device that prevents vehicle theft from being successful. More specifically, the device can be activated to prevent successful vehicle theft while the theft is occurring. In addition, the device can be advantageously activated remotely to prevent successful vehicle theft. In this manner, the remote vehicle theft-prevention and recovery device provides a solution to stopping a vehicle theft from being successful after the theft has occurred.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
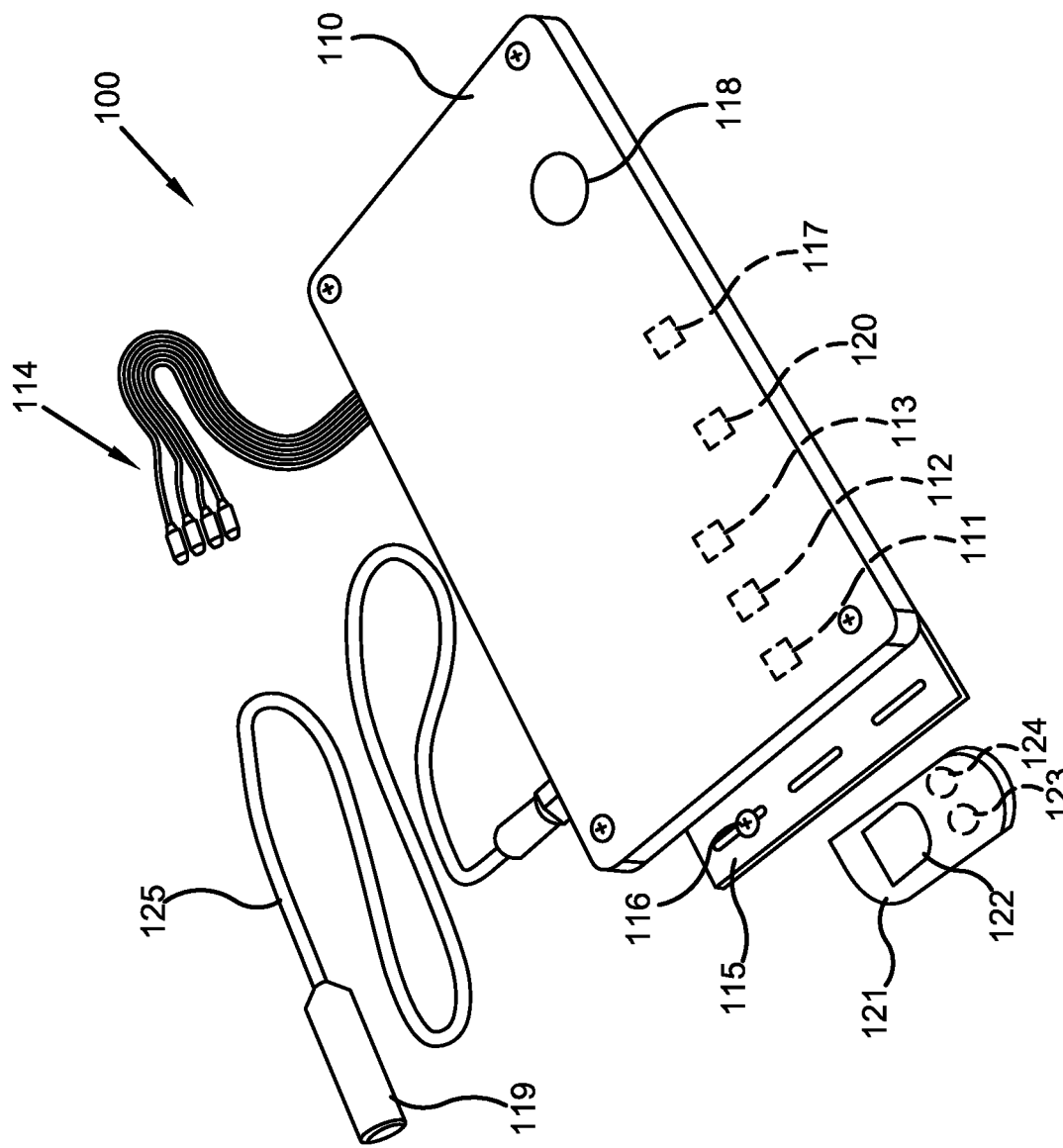
FIG. 1 illustrates a perspective view of one potential embodiment of a remote vehicle theft-prevention and recovery device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that prevents vehicle theft attempts from being successful. There also exists a long-felt need in the art for a remote vehicle theft prevention device that can be activated to prevent successful vehicle theft while the theft is occurring. More specifically, there exists a long-felt need in the art for a remote vehicle theft prevention device that can be activated remotely to prevent successful vehicle theft.

The present invention, in one exemplary embodiment, is comprised of a remote vehicle theft-prevention and recovery device. The device is comprised of a module that can be installed within or on a vehicle, wherein the module has a plurality of features that can be controlled via a remote fob and/or a mobile application to allow a user to prevent the stealing of the vehicle the module is installed within.

The module is comprised of at least one lead wire that places at least one processor of the module in wired electrical communication with the electronic computer system of the vehicle the module is installed on/in. The module is also comprised of a plurality of transmitters including a GPS transmitter which transmits the real-time GPS location of the module (and thus the vehicle) using satellite or other wireless GPS signals known in the art. The module is also comprised of at least one wireless transmitter that places the module in wireless electrical communication with at least one wireless receiver of the fob and/or the smart device the mobile application is installed on. The module receives wireless communication from at least one wireless transmitter of the fob and/or smart device that the mobile application is installed on.

In addition, the module is comprised of at least one speaker that produces a loud audible alarm, tone, sound, etc., to deter a thief from continuing to steal the vehicle. The module may also be comprised of at least one camera connected to the module such that the camera can record photo and video of the thief stealing the vehicle, wherein photos/videos from the camera can then be uploaded to the mobile application via the transmitter and stored.

Additionally, the module has a plurality of other features. Said features may be accessed/controlled via at least one button on the fob or via the mobile application/software once installed on a smart device such as, but not limited to, a cell phone, a tablet, a computer, etc. A first feature allows a user to remotely activate the hazard lights of the vehicle to alert other drivers around the vehicle. Another feature includes allowing a user to remotely lock the doors and windows of the vehicle, such that said lock cannot be overridden by the thief manually attempting to unlock the door/window using the manual buttons inside the vehicle. A user can also activate the speaker to produce an audible alarm. Furthermore, the camera can be remotely activated to take photos/video of the location of the vehicle and/or the thieves who have stolen the vehicle. In addition, the acceleration of the vehicle can be limited via electrical communication from the lead wire to the accelerator position sensor of the vehicle which configures the sensor to not allow the vehicle to accelerate above idle speed. A user can also view the real-time GPS location of the module on a map interface.

The present invention is also comprised of a first method of using the device. First, a device is provided comprised of a module comprised of a GPS transmitter, a wireless transmitter, a receiver, a lead wire, a battery, a speaker, and a camera; and a fob comprised of at least one button, a transmitter, and a receiver. Once a vehicle the module is attached to has been stolen, a user can press the button on the fob to control a function of the module such as, but not limited to, activating the camera, activating the speaker to produce an audible alarm, activating the hazard lights of the vehicle, locking the doors/windows of the vehicle, limiting the acceleration of the vehicle, viewing the GPS location of the vehicle, etc.

The present invention is also comprised of a second method of using the device. First, a device is provided comprised of a module comprised of a GPS transmitter, a wireless transmitter, a receiver, a lead wire, a battery, a speaker, a camera, and a mobile application. Once a vehicle the module is attached to has been stolen, a user can use the mobile application to a control a function of the module such as, but not limited to, activating the camera, activating the speaker to produce an audible alarm, activating the hazard lights of the vehicle, locking the doors/windows of the vehicle, limiting the acceleration of the vehicle, viewing the GPS location of the vehicle, etc.

Accordingly, the remote vehicle theft-prevention and recovery device of the present invention is particularly advantageous as it is a device that prevents vehicle thefts from being successful. More specifically, the device can be activated to prevent successful vehicle theft while the theft is occurring. In addition, the device can be advantageously activated remotely to prevent successful vehicle theft. In this manner, the remote vehicle theft-prevention and recovery device provides a solution to stopping a vehicle theft from being successful after the theft has occurred.

Referring initially to the drawings, FIG. 1 illustrates a perspective view of one potential embodiment of a remote vehicle theft-prevention and recovery device 100 of the present invention in accordance with the disclosed architecture. The device 100 is comprised of a module 110 that can be installed within (i.e., the interior or engine bay) or on a vehicle (i.e., on the vehicle undercarriage), wherein the module 110 has a plurality of features that can be controlled via a remote fob 121 and/or a mobile application 130 to prevent the stealing of the vehicle the module 110 is installed within/on. The module 110 is comprised of at least one mounting bracket 115. The bracket 115 allows the module 110 to be mounted on the exterior or interior of a vehicle via at least one fastener 116 such as, but not limited to, a bolt, a screw, a magnet, an adhesive fastener, etc.

The module 110 is comprised of at least one lead wire 114 that places at least one processor 120 of the module in wired electrical communication with the electronic computer system of the vehicle the module 110 is installed on/in. The lead wire 114 may be any type of wire or electrical connector known in the art.

The module 110 is also comprised of a plurality of transmitters. The module 110 is comprised of at least one GPS transmitter 113 which transmits the real-time GPS location of the module 110 (and thus the vehicle) using satellite or other wireless GPS signals known in the art. The module 110 is also comprised of at least one wireless transmitter 112. The wireless transmitter 112 places the module 110 in wireless electrical communication with at least one wireless receiver 124 of the fob 121 and/or the smart device the mobile application 130 is installed on. The transmitter 112 may utilize any wireless communication known in the art such as, but not limited to, Wi-Fi, Bluetooth, RFID, satellite, etc.

Further, the module 110 receives wireless communication from at least one wireless transmitter 123 of the fob 121 and/or smart device that the mobile application 130 is installed on. The transmitter 123 may utilize any wireless communication known in the art such as, but not limited to, Wi-Fi, Bluetooth, RFID, satellite, etc.

The module 110 is powered by at least one battery 117. In one embodiment, the battery 117 is a removable, rechargeable battery. However, in the preferred embodiment the battery 117 is charged by and receives, continuous electrical power from the vehicle the module 110 is installed on/in via the lead wires 114.

The module 110 is also comprised of at least one speaker 118. The speaker 118 produces a loud audible alarm, tone, sound, etc., to deter a thief from continuing to steal the vehicle. The speaker 118 may be activated on a delay (via the fob 121 or mobile application 130), such that the occupants of the vehicle are not exposed to the alarm while still in the vehicle.

The module 110 may also be comprised of at least one camera 119 connected to the module 110 via at least one repositionable camera arm 125. In this manner, the camera 119 can record photos and videos of the thief stealing the vehicle, wherein photos/videos from the camera 119 can then be uploaded to the mobile application 130 via the transmitter 112 and stored.

Figure 2:
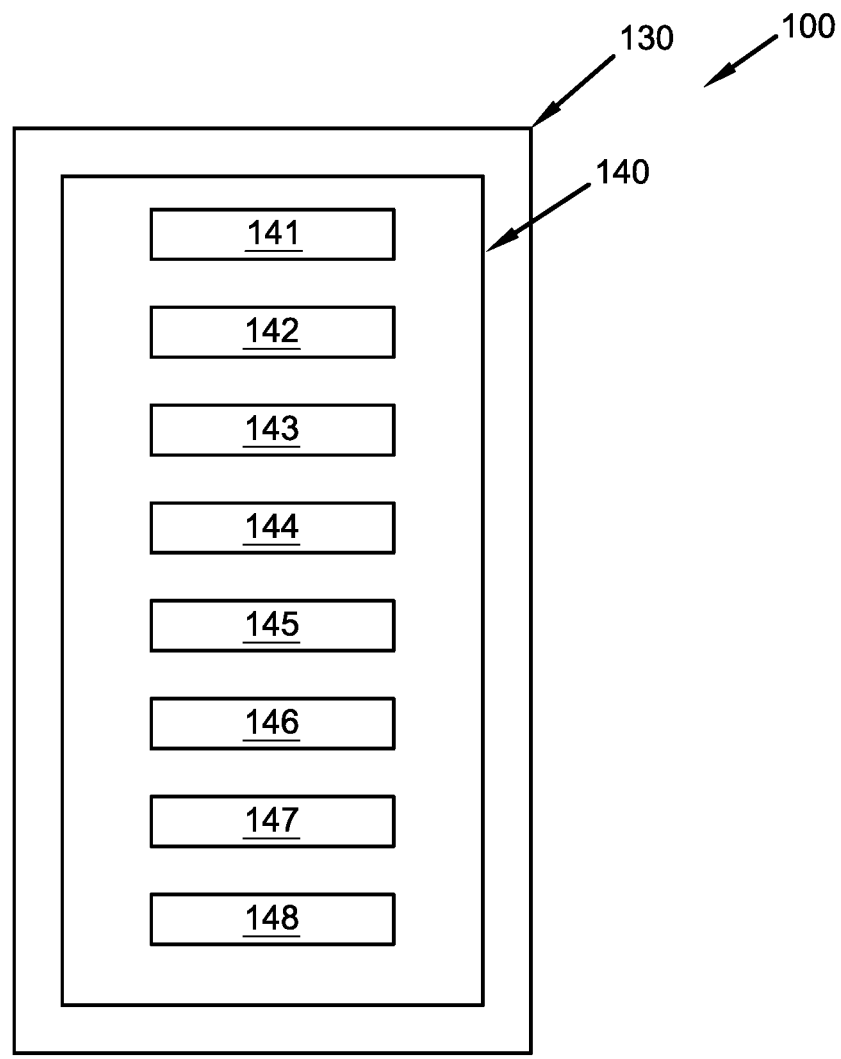
FIG. 2 illustrates a graphical view of functions of one potential embodiment of a remote vehicle theft-prevention and recovery device of the present invention in accordance with the disclosed architecture.

At least one processor 120 of the module 110 controls the functions of the module 110 such as, but not limited to, the speaker 118, the camera 119, etc. However, the module 110 is also comprised of a plurality of other functions 140, as seen in FIG. 2. Said functions 140 may be accessed/controlled/activated via at least one button 122 on the fob 121 or via the mobile application/software 130 once installed on a smart device such as, but not limited to, a cell phone, a tablet, a computer, etc.

One such function 140 allows a user to remotely activate the hazard lights 141 of the vehicle to alert other drivers around the vehicle. Another function 140 includes allowing a user to remotely lock the doors and windows of the vehicle 142, such that said lock cannot be overridden by the thief manually attempting to unlock the door/window using the manual buttons inside the vehicle. As mentioned, a user can also activate the speaker to produce an audible alarm 143. Furthermore, the camera can be remotely activated 144 to take photos/video of the location of the vehicle and/or the thieves who have stolen the vehicle. In addition, the acceleration of the vehicle can be limited 145 via electrical communication from the lead wire 114 to the accelerator position sensor of the vehicle. Said communication configures the sensor to not allow the vehicle to accelerate above idle speed and will thus reduce the speed of the vehicle in a safe manner if stolen.

A user can also view the real-time GPS location of the module 110 on a map interface 146. In addition, a user can share control of the application 130 (and all information within the application) with law enforcement 147 using credentials and cloud sharing. Finally, the module 110 can be reset/disabled (i.e., when the vehicle has been recovered) via a reset code 148 that can be delivered to the smart device of the user via an SMS message, email, call, etc., wherein the code 148 can then be input into the mobile application 130.

Figure 3:
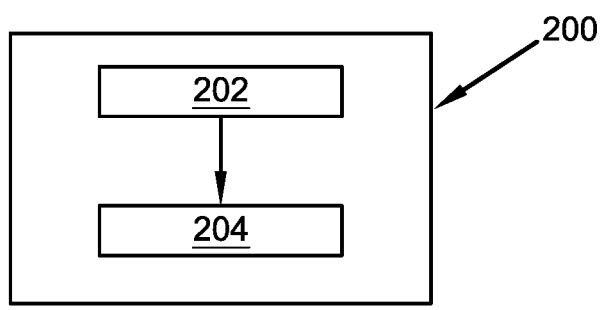
FIG. 3 illustrates a flowchart of a method of using one potential embodiment of a remote vehicle theft-prevention and recovery device of the present invention in accordance with the disclosed architecture.

The present invention is also comprised of a method of using 200 the device 100, as seen in FIG. 3. First, a device 100 is provided comprised of a module 110 comprised of a GPS transmitter 113, a wireless transmitter 112, a receiver 111, a lead wire 114, a battery 117, a speaker 118, and a camera 119; and a fob 121 comprised of at least one button 122, a transmitter 123, and a receiver 124 [Step 202]. Once a vehicle the module 110 is attached to a vehicle and said vehicle has been stolen, a user can press the button 122 on the fob 121 to control a function of the module 110 [Step 204]. Said functions include activating the camera 119, activating the speaker 118 to produce an audible alarm, activating the hazard lights of the vehicle 141, locking the doors/windows of the vehicle 142, limiting the acceleration of the vehicle 146, viewing the GPS location of the vehicle 146, and resetting the module 110 and/or any of said features.

Figure 4:
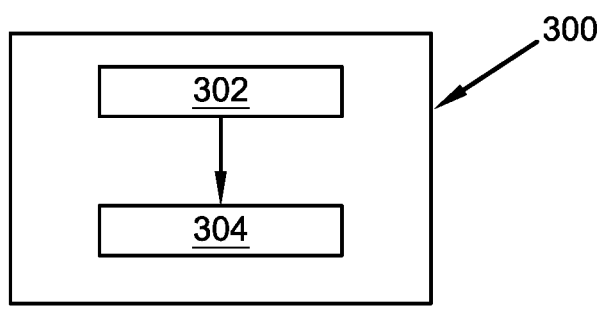
FIG. 4 illustrates a flowchart of a method of using one potential embodiment of a remote vehicle theft-prevention and recovery device of the present invention in accordance with the disclosed architecture.

The present invention is also comprised of a method of using 300 the device 100, as seen in FIG. 4. First, a device 100 is provided comprised of a module 110 comprised of a GPS transmitter 113, a wireless transmitter 112, a receiver 111, a lead wire 114, a battery 117, a speaker 118, a camera 119, and a mobile application 130 [Step 302]. Once the module 110 has been attached to a vehicle and the vehicle has been stolen, a user can use the mobile application 130 to control a function of the module 110 [Step 304]. Said functions include activating the camera 119, activating the speaker 118 to produce an audible alarm, activating the hazard lights of the vehicle 141, locking the doors/windows of the vehicle 142, limiting the acceleration of the vehicle 146, viewing the GPS location of the vehicle 146, sharing credentials/access to the mobile application 130 with law enforcement, and resetting the module 110 and/or any of said features.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "remote vehicle theft-prevention and recovery device" and "device" are interchangeable and refer to the remote vehicle theft-prevention and recovery device 100 of the present invention.

Notwithstanding the foregoing, the remote vehicle theft-prevention and recovery device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the remote vehicle theft-prevention and recovery device 100 as shown in the FIGS. are for illustrative purposes only, and that many other sizes and shapes of the remote vehicle theft-prevention and recovery device 100 are well within the scope of the present disclosure. Although the dimensions of the remote vehicle theft-prevention and recovery device 100 are important design parameters for user convenience, the remote vehicle theft-prevention and recovery device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A remote vehicle theft-prevention and recovery device comprising:
    a module comprised of:
        a wireless transmitter;
        a GPS transmitter;
        a module receiver;
        a mounting bracket comprising a magnetic fastener for mounting the module in an interior of a vehicle;
        a lead wire;
        a battery;
        a speaker;
        a camera;
        a processor; and
        a fob comprised of a button, a fob transmitter, and a fob receiver.

2. The remote vehicle theft-prevention and recovery device of claim 1, wherein the fob transmitter is in wireless electrical communication with the wireless transmitter.

3. The remote vehicle theft-prevention and recovery device of claim 2, wherein the fob transmitter is in wireless electrical communication with the wireless transmitter via a Bluetooth connection.

4. The remote vehicle theft-prevention and recovery device of claim 2, wherein the fob transmitter is in wireless electrical communication with the wireless transmitter via a Wi-Fi connection.

5. The remote vehicle theft-prevention and recovery device of claim 2, wherein the fob transmitter is in wireless electrical communication with the wireless transmitter via a satellite connection.

6. The remote vehicle theft-prevention and recovery device of claim 1, wherein the speaker produces an audible alarm.

7. The remote vehicle theft-prevention and recovery device of claim 6, wherein the production of the audible alarm is delayed.

8. A remote vehicle theft-prevention and recovery device comprising:
    a module comprised of:
        a wireless transmitter;
        a GPS transmitter;
        a module receiver;
        a mounting bracket comprising an adhesive fastener for mounting the module in an interior of a vehicle;
        a lead wire;
        a battery;
        a speaker;
        a camera;

a processor; and a mobile application comprising a map interface configured to display a real-time location of the module; and wherein the GPS transmitter is configured to transmit the real-time GPS location of the module to the map interface of mobile application.

9. The remote vehicle theft-prevention and recovery device of claim 8, wherein the mobile application is in wireless electrical communication with the wireless transmitter.

10. The remote vehicle theft-prevention and recovery device of claim 8, wherein the camera is comprised of a repositionable arm.

11. The remote vehicle theft-prevention and recovery device of claim 8, wherein the mobile application controls a function of the module.

12. The remote vehicle theft-prevention and recovery device of claim 11, wherein the function of the module is comprised of remotely activating a hazard light of a vehicle the module is in electrical communication with.

13. The remote vehicle theft-prevention and recovery device of claim 11, wherein the function of the module is comprised of remotely locking a door or a window of a vehicle the module is in electrical communication with.

14. The remote vehicle theft-prevention and recovery device of claim 11, wherein the function of the module is comprised of taking a photo or a video via the camera.

15. The remote vehicle theft-prevention and recovery device of claim 11, wherein the function of the module is comprised limiting the acceleration of a vehicle the module is in electrical communication via an accelerator position sensor of the vehicle.

16. The remote vehicle theft-prevention and recovery device of claim 8, wherein the module can be reset via a reset code.

17. The remote vehicle theft-prevention and recovery device of claim 8, wherein access to the mobile application can be shared using a credential sharing.

18. A method of using a remote vehicle theft-prevention and recovery device, the method comprising the steps of:

providing a remote vehicle theft-prevention and recovery device comprised of a module comprised of a GPS transmitter, a wireless transmitter, a receiver, a lead wire, a battery, a speaker, and a camera; and a mobile application and a fob; and attaching the module to a vehicle via a mounting bracket comprising a magnetic fastener and using the mobile application or the fob to activate a function of the module remotely; and wherein the mobile application comprises a map interface configured to display a real-time location of the module; and wherein the GPS transmitter is configured to transmit the real-time GPS location of the module to the map interface of mobile application.

* * * * *